3,446,952
SURGICAL LIGHT AND OPTICAL FIBER BUNDLE
COMBINATION
Donald F. Sitter and Robert P. Herzog, Erie, Pa., assignors to American Sterilizer Company, Erie, Pa., a corporation of Pennsylvania
Filed Feb. 24, 1966, Ser. No. 529,819
Int. Cl. F21v 33/00; F21s 15/00
U.S. Cl. 240—1.4
4 Claims

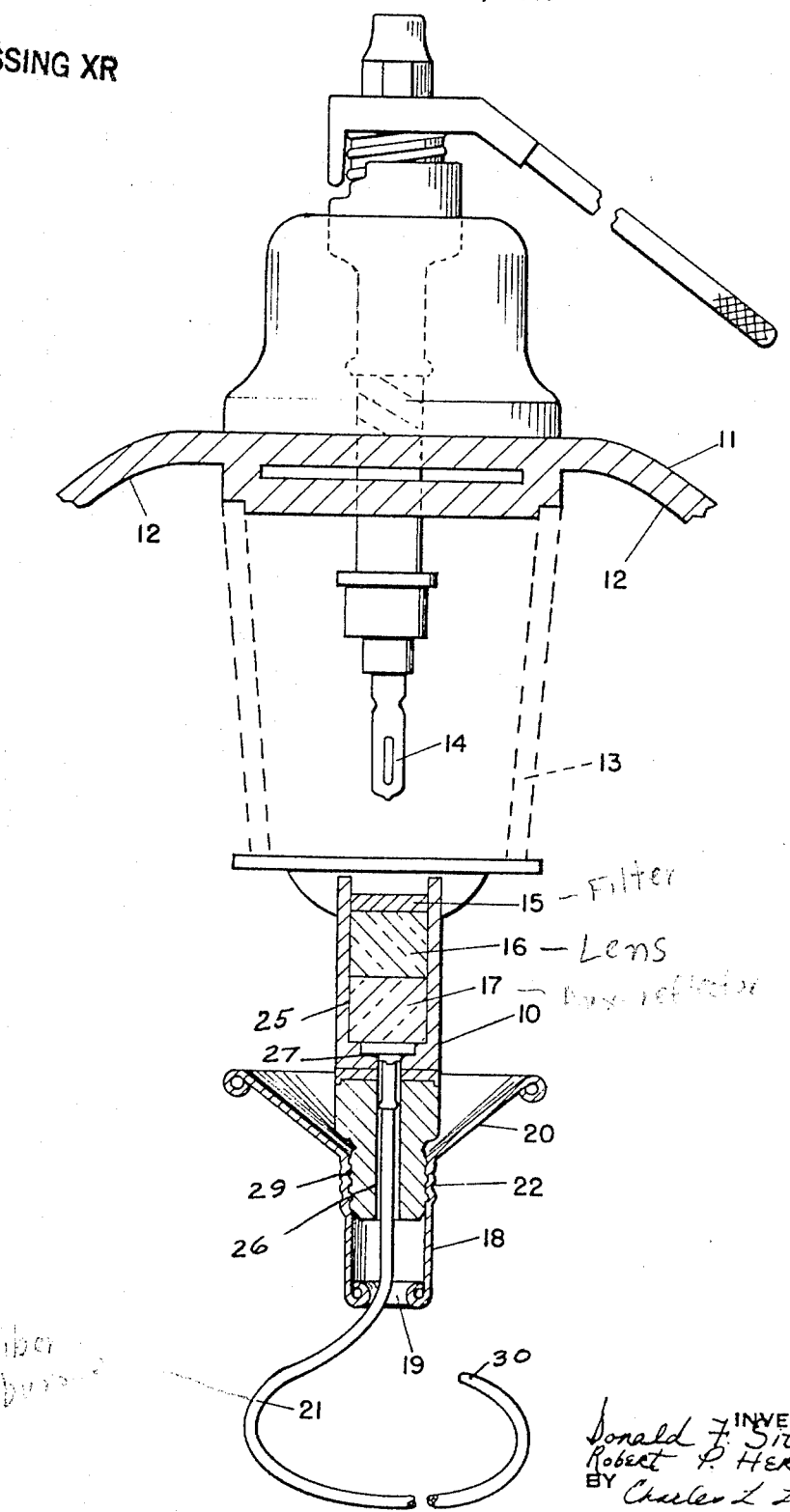

ABSTRACT OF THE DISCLOSURE

A surgical light illuminating apparatus employing a source of light, a handle, a lens and an optical fiber bundle. The handle for adjusting the position of the apparatus is mounted adjacent to the light source. The optical fiber bundle, having one end adjacent to the light source, extends through the handle. The light emitting end of the optical fiber bundle is disposed remote from the handle. A lens is mounted in the handle between the light source and the optical fiber handle for directing light into the end of the optical fiber bundle.

---

This invention relates to surgical lights and, more particularly, to a reflector type surgical light in combination with an optical fiber bundle.

This invention incorporates an improvement over the surgical light disclosed in Patent No. 2,798,938, and provides in combination with such a surgical light an optical fiber bundle. The structure for incorporating the optical fiber bundle in combination with the surgical light also comprises a part of the invention.

It is, accordingly, an object of the invention to provide an improved combination surgical reflector-type light and optical fiber bundle.

Another object of the invention is to provide a combination surgical light, optical fiber bundle, and sterilizable handle.

Another object of the invention is to provide an improved optical fiber bundle and light source therefor.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

The figure of drawing shows a longitudinal cross sectional view of the combination reflector type light, light source, and optical fiber bundle, according to the invention.

Now with more particular reference to the drawing, the light indicated generally at 11 may be of the type shown in Patent No. 2,798,938, or any other suitable reflector type surgical light having a handle attached to its lower and for adjusting the position of the light. The light will be provided with a lamp indicated generally at 14, which will be provided with a suitable electrical connection. The lamp 14 will be supported below the reflector 12 within the heat filter 13 and above the color and heat filter element 15.

The hollow handle 10 will be attached to the heat filter 13 in a suitable manner, for example, in the manner the heat filter in the said patent is attached to the handle. The handle 10 will be of some non-electrical conducting material and will be hollow as shown, and in the hollow handle 10 will be received the lense system 16, which will be disposed in a counterbore 25 and arranged to direct the light from lamp 14 onto the end of the fiber bundle 21. A reflector 17 will be used to direct part of the light from lamp 14 through filter element 15 and lense system 16 to fiber bundle 21. It has been discovered that by using the auxiliary reflector 17, that one lense at 16 is sufficient for practical purposes. The fiber bundle 21 will extend through the hole 26 in the handle and it will have an end 27 fixing it to the handle in a suitable manner. The lower end of the handle 10 will be threaded at 29, and this threaded end will receive the internal threads 22 on the cup shaped handle 18. The handle 18 has the outwardly flared part 20 integral with its upper end to prevent the hand of the operator from contaminating the surgical light.

The cup shaped handle 18 has an opening 19 at its lower end through which the optical fiber bundle extends and the metal of the cup shaped handle may be rolled back on itself, as shown, at the hole 19 so that it will not injure the outside of the fiber bundle.

It will be noted that the user may grasp the handle 18 and maneuver the light to the desired position relative to the operating table. Then the optical fiber bundle may be maneuvered so that its light emitting end 30 is at the desired position. After use, the handle 18 may be removed and resterilized.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a surgical light having a reflector, a light source, and a handle on the light to adjust the position of said light,
   an optical fiber bundle extending through said handle,
   said light having means for mounting the light on a support above and spaced from the field to be illuminated and for free movement,
   said handle being attached to said light adjacent said light source,
   said optical fiber bundle having a light receiving end adjacent said light source and adapted to receive light therefrom,
   said optical fiber bundle having a light emitting end disposed remote from said handle,
   a lens is disposed on said light between said light source and said light receiving end, whereby light is directed from said light source onto an end of said optical fiber bundle.

2. In combination, a surgical light having a reflector, a light source, and a handle on the light to adjust the position of said light,
   an optical fiber bundle extending through said handle,
   said light having means for mounting the light on a support above and spaced from the field to be illuminated and for free movement,
   said handle being attached to said light adjacent said light source,
   said optical fiber bundle having a light receiving end adjacent said light source and adapted to receive light therefrom,
   said optical fiber bundle having a light emitting end disposed remote from said handle,
   said handle comprises a threaded stud and a hollow cup shaped sterilizable member fitted over and enclosing said stud,
   said sterilizable member having a continuous surface to facilitate sterilization, said member having a closed bottom wall having an opening therein for said optical bundle to pass through,
and lens means on the inside of said cup shaped member.
3. The combination recited in claim 2 wherein said sterilizable member has an outwardly flaring guard flange at its upper end integral with said handle, said flange flaring outwardly and overlying said threaded stud to prevent contact with unsterilized surfaces of said structure upon grasping the handle to adjust said light and said optical fiber.
4. The combination recited in claim 1 wherein said lens is disposed in a counterbore in said handle between said light source and said fiber bundle.

References Cited

UNITED STATES PATENTS

| 2,173,325 | 9/1939 | Alexander | 240—1.4 |
| 2,798,938 | 7/1957 | Jewell | 240—1.4 |
| 3,131,690 | 5/1964 | Innis et al. | 128—23 |
| 3,360,640 | 12/1967 | Ernst-Otto Seitz et al. | 240—1.4 |

FOREIGN PATENTS 536,887   5/1941   Great Britain.

NORTON ANSHER, *Primary Examiner.*
R. B. GREINER, *Assistant Examiner.*

U.S. Cl. X.R.

240—1, 41.15